Aug. 22, 1967     J. P. CARLTON     3,336,958
STUMP CUTTER

Filed April 9, 1965                 3 Sheets-Sheet 1

INVENTOR.
JOHN P. CARLTON
BY
ATTORNEY

Aug. 22, 1967     J. P. CARLTON     3,336,958
STUMP CUTTER

Filed April 9, 1965     3 Sheets-Sheet 2

INVENTOR.
JOHN P. CARLTON
BY
ATTORNEY

Aug. 22, 1967  J. P. CARLTON  3,336,958
STUMP CUTTER
Filed April 9, 1965  3 Sheets-Sheet 3
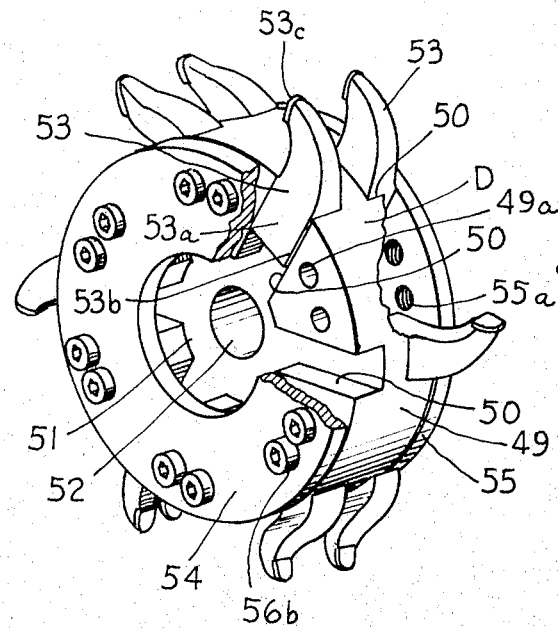
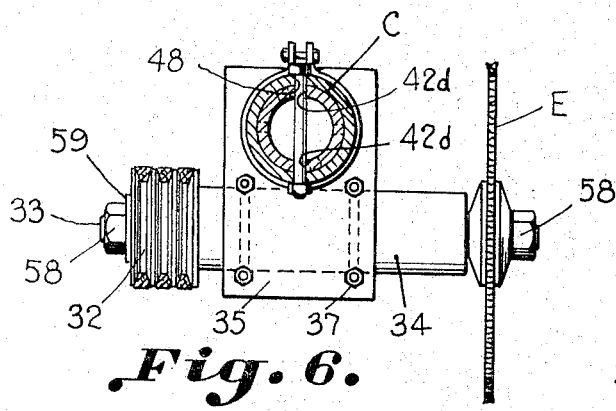
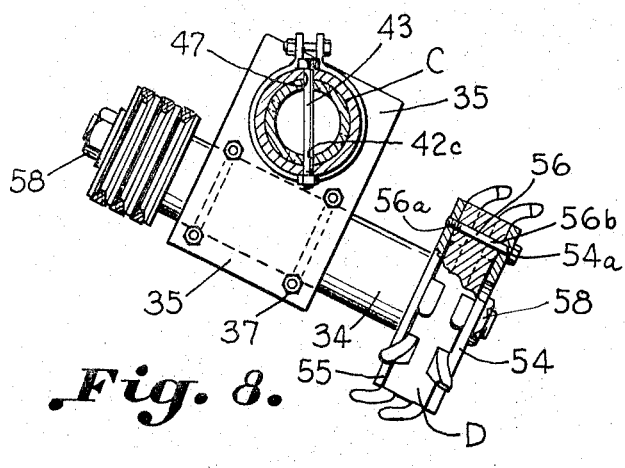
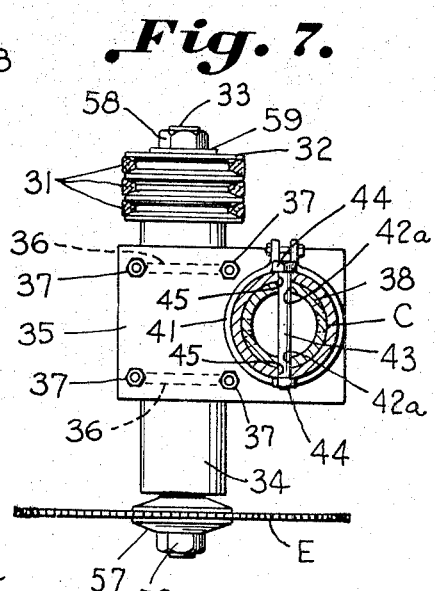
INVENTOR.
JOHN P. CARLTON
BY
ATTORNEY 3,336,958
STUMP CUTTER
John P. Carlton, 777 Duncan Park Drive,
Spartanburg, S.C. 29301
Filed Apr. 9, 1965, Ser. No. 446,817
6 Claims. (Cl. 144—2)

This invention relates to power operated cutting devices having special application to cutting stumps.

Power operated stump cutters have been used heretofore, but such generally employ a fixed cutter carried by a boom wherein the cutting operation proceeds along the portion of the stump nearest the operator. This results in wood being thrown in the direction of the operator and makes for difficulty in applying the cutting tool to the stump. Such devices are awkward to operate and depend for any sort of successful operation upon the strength of the operator. Such devices have formerly been very expensive and awkward to handle and must be built primarily for the stump cutting operation only, limiting the applicability of the machine to other general uses.

Accordingly, it is an important object of the invention to provide a more maneuverable, less complicated stump cutter.

Another important object of the invention is to provide a stump cutter which may be pivoted about a fixed wheel for cutting a swath on the side of the stump remote from the user.

Another object of the invention is to provide a stump cutter adapted to cutting a swath in an arcuate path along the rear portion of the stump remote from the user having means for registering the cutter backward a predetermined amount preparatory to cutting the next swath.

Still another important object of the invention is the provision of a stump cutter head which will permit cutting on the rear of a stump and for easy adjustment permitting easy stump cutting and versatile cutting action.

Yet another object of the invention is to provide a stump cutting element having easily replaceable positively positioned teeth.

The construction designed to carry out the invention will be hereinafter described, together with other features thereof.

Figure 1:
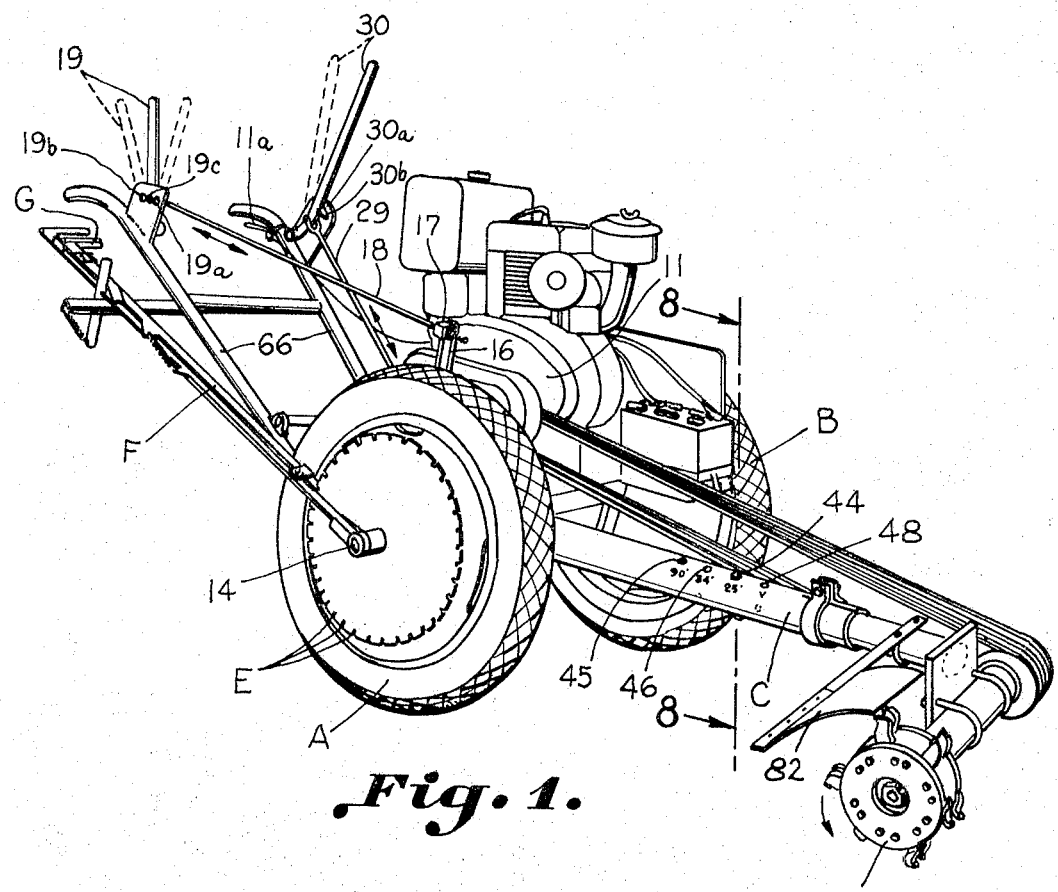
Figure 2:
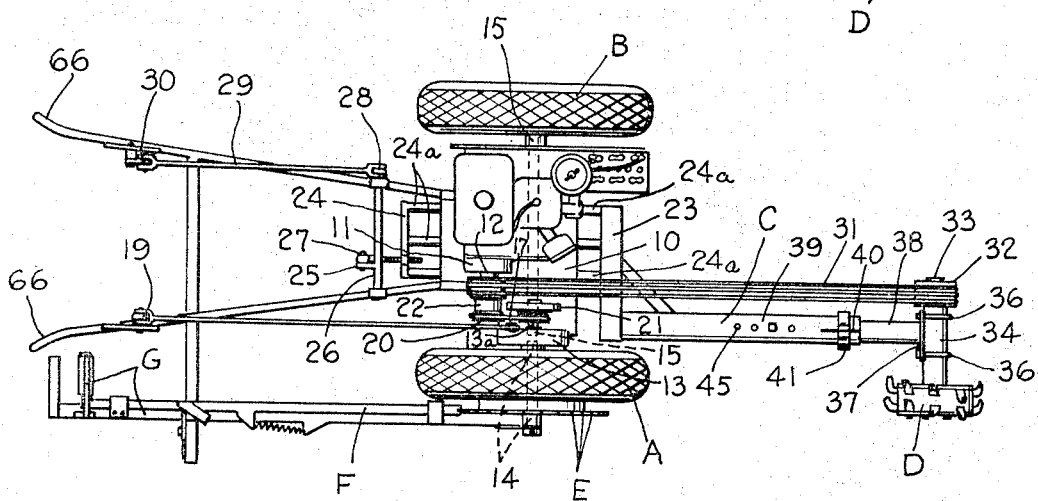
Figure 3:
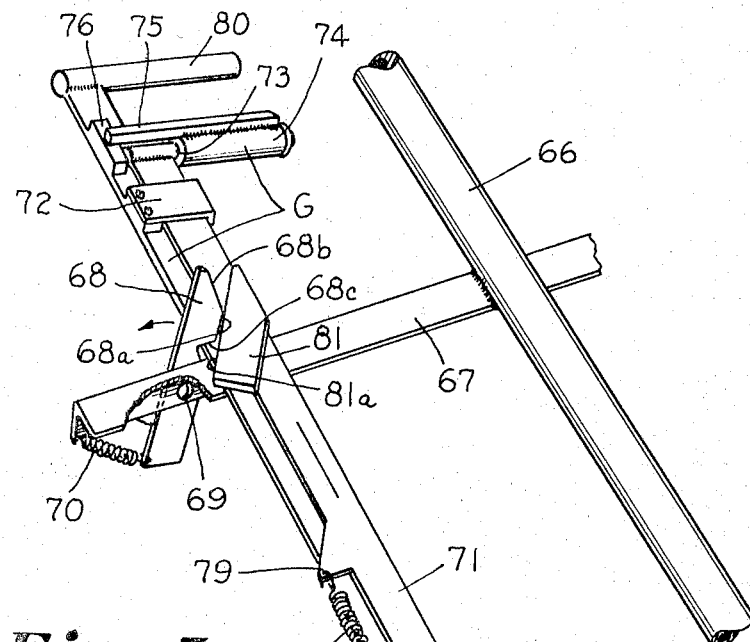
Figure 4:
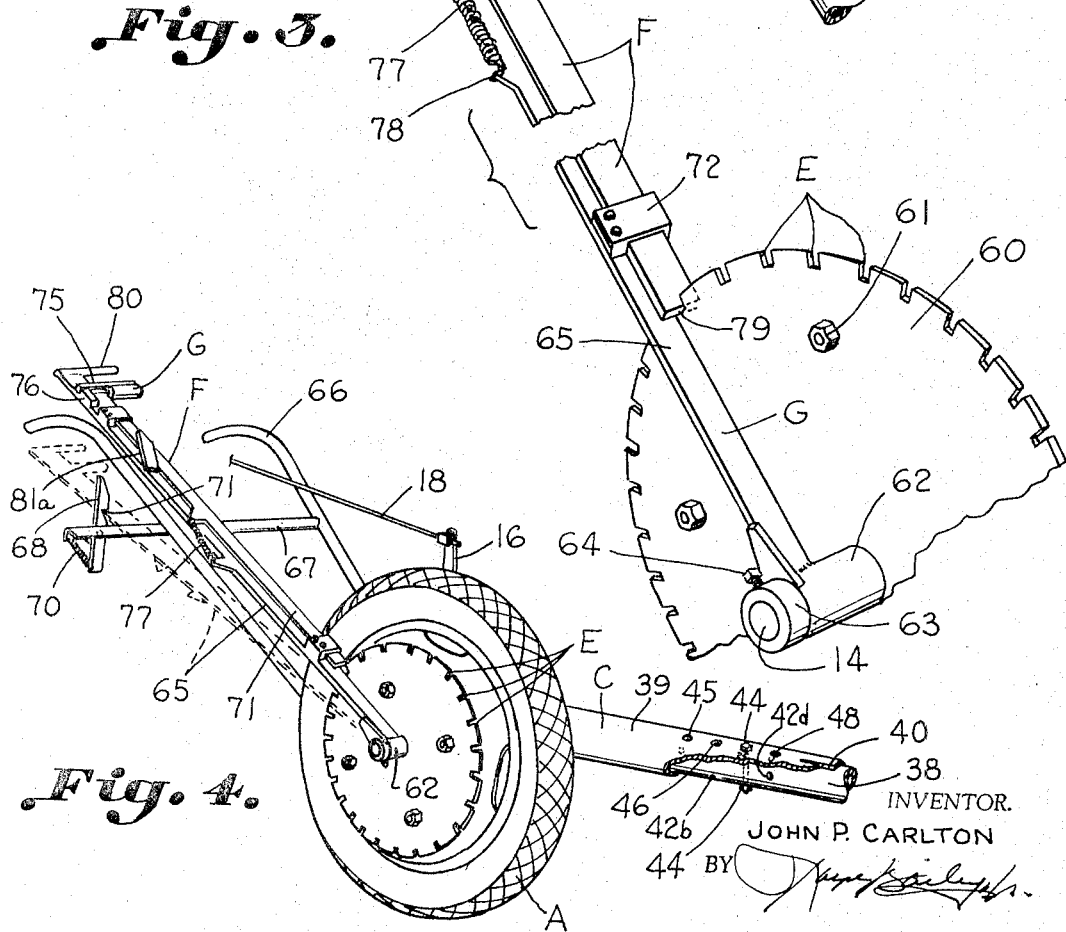

The invention will be more readily understood from a reading of the following specification and by reference to the accompanying drawings forming a part thereof, wherein an example of the invention is shown and wherein:

FIGURE 1 is a perspective view illustrating a stump cutter constructed in accordance with the present invention, FIGURE 2 is a plan view further illustrating the stump cutter shown in FIGURE 1, FIGURE 3 is an enlarged perspective view of the left-hand portion of FIGURE 1 illustrating the means for fixing a wheel of the stump cutter and for registering the stump cutter backward by a predetermined amount, FIGURE 4 is an enlarged perspective view at a reduced scale similar to FIGURE 3, but illustrating the parts in several positions, and illustrating details of the boom construction, FIGURE 5 is an enlarged perspective view of a stump cutting element constructed in accordance with the present invention, FIGURE 6 is a transverse sectional elevation at an enlarged scale taken through the boom looking toward the right-hand side of FIGURE 1, illustrating a saw with the boom so positioned as to position the saw vertically, FIGURE 7 is a transverse sectional view similar to FIGURE 6, but illustrating the parts associated with the boom in depending position to horizontally support the saw blade, and FIGURE 8 is a transverse sectional elevation taken on the line 8—8 in FIGURE 1, at an enlarged scale, illustrating the parts associated with the boom in an inclined position to lower a stump cutter to the proper angle for cutting a swath across the rear of a stump.

The drawings illustrate a stump cutter having a pair of spaced wheels A and B carried for rotation by a chassis. A forwardly projecting boom C is carried by the chassis. A driven cutter D is carried by the boom adjacent the free end thereof. A plurality of circumferentially spaced engaging means E, carried in fixed relation to one of said wheels, are provided for engagement with a locking element F carried by the chassis in fixed relation thereto when in locking position for actuating the engaging means to fix said one wheel with respect to the chassis leaving the other wheel free for rotation. Means illustrated at G are provided for advancing the locking element F to engage a succeeding engaging means E and for moving the locking means for moving the succeeding engaging means rearwardly to locking position thus moving the chassis rearwardly by a predetermined amount. Thus, the cutter chassis may be pivoted about said one wheel during a stump cutting operation and the chassis moved rearwardly preparatory to another cutting operation.

The stump cutter includes a rectangular chassis 10 which carries the wheels A and B, the motor 11 and associated parts for driving the wheels A and B, and mounting means for the cutter D. The wheels A and B may be driven from the power take-off 12 through a gear box 13 which includes both reduction and differential gears. The differential gears make it possible for the shaft 14, upon which the wheel A is fixedly mounted, to be driven at a different speed than the shaft 15 upon which the wheel B is fixedly mounted. It is important that if the shaft 14 is fixed against rotation the differential gearing will permit free-wheeling of the shaft 15 carrying the wheel B.

The gear box 13 is mounted for rotation upon the shafts 14 and 15, as illustrated in broken lines in FIGURE 2, and its angular position may be varied through manipulation of the link 16 which has suitable connection as at 17 to a rod 18 which may be placed in one of three positions through manipulation of the pivoted handle 19. With the rod 18 in forward-most position the belt 20 is tightened upon its sheaves to drive the reduction gears of the gear box 13 through the shaft 13a carried thereby, and consequently drive the wheels A and B to move the unit in one direction. A locking pin (not shown) is carried by the handle 19, and when the rod 18 is in forwardmost position, is in the aperture 19a. With the rod 18 in rearmost position, the locking pin is in the aperture 19b, and the friction wheel 21 engages a friction applying portion 22 of the power take-off to reverse the direction of the drive of the wheels A and B. With the rod 18 in intermediate position neither the wheel A nor the wheel B is driven, and both would normally be in free-wheeling condition. The locking pin would be in aperture 19c and the handle 19 in solid line position in FIGURE 1. The forward-most and rear-most positions of the handle 19 are illustrated in broken lines adjacent respective apertures 19a and 19b. The parts and operation described thus far are standard with devices of this kind.

The boom C is rigidly connected to the transverse member 23 which is carried by a sliding platform 24. The platform 24 is slidably carried by the chassis 10 by bars 24a which form a part of the platform 24. The platform 24 may be pushed forwardly by the link 25 fixed upon the shaft 26 as it bears against an extension 27 of the platform 24. The shaft 26 may be rotated by manipulation of the link 28 through the rod 29 by the pivoted handle 30. When the platform 24 is in forward-most position, with the locking pin 30a carried by the handle 30 in the aperture 30b, the belts 31 are tightened so as to be driven from the power take-off 12 to drive a sheave 32 connected to the drive shaft 33 carrying the cutter D. When the handle 30 is in dotted line position, as illustrated in FIGURE 1, with the locking pin 30a in a rearwardly spaced aperture (not shown) the belts 31 are loosened so as not to be driven. The handle 11a controls the speed of operation of the motor 11.

The shaft 33 is carried for rotation within the mandrel 34. The mandrel 34 is fixedly connected to a plate 35 by suitable means such as U-shaped bolts 36 which receive nuts 37 on their free ends. The plate 35 has fixed connection with the tubular member 38 which forms a part of the boom C. The tubular member 38 is received within a slightly larger tubular member 39 which has a slit end portion as at 40. A clamp 41 fixes the end of the tubular member 38 within the adjacent end of the tubular member 39. The tubular member 38 has a series of pairs of opposed apertures 42a, 42b, 42c and 42d which respectively receive a bolt 43 carrying nuts 44 at each end thereof. Each pair of apertures is inclined with respect to each succeeding pair of apertures. A pair of complementary apertures 45 within the tubular member 39 receive the bolts through the innermost pair of apertures 42a for maintaining the mandrel 34 in vertical position, permitting the cutting element to rotate in a horizontal plane, as illustrated in FIGURE 7. A second pair of apertures 46 receive the pin 43 through apertures 42b (see FIGURE 4) which permits the mandrel to assume a lesser angle. As illustrated in FIGURE 8, the pin 43 is received within apertures 47 through apertures 42c which permit the mandrel to assume a more nearly horizontal position. FIGURE 6 illustrates the pin passing through apertures 48 and 42d which permits the mandrel to assume a horizontal position and permits the cutting element to rotate in a vertical plane.

As is best shown in FIGURE 5, the cutting element includes a centrally disposed cylindrical element 49 which has a plurality of radially extending circumferentially spaced slots 50 therein, opposite each other, on both sides thereof. The slots 50 terminate in a recessed central portion 51. A central bore 52 is provided for receiving the shaft 33. A plurality of cutting elements 53, each having a shank portion 53a of substantially rectangular cross-section, are received within the slots 50. It will be observed that the shank portions are slightly thicker than the slots so that a portion of 53a extends outwardly of the central cylindrical member 49 as illustrated at 43b. Each of the cutting elements is provided with cutting teeth, as illustrated at 53c, all of which face in the same direction. A pair of doughnut shaped discs 54 and 55 are secured on either side of the central cylindrical member 49 to engage the shank members 53a and specifically the outwardly extending portion 53b thereof. The disc members 54 and 55 are secured together by bolts 56 (see FIGURE 8), which pass through spaced apertures 49a within the central cylindrical portion 49. One end of each of the bolts 56 is threaded as at 56a and received within threaded apertures 55a carried by the disc 55. The other end of the bolt 56 passes through apertures 54a within the disc 54, and a head 56b is provided for tightening the bolts 56. Thus, the teeth may be easily replaced by removing the bolts 56. The slots 50 tightly receive the teeth and provide a firm seat therefor.

FIGURES 6 and 7 illustrate a cutter D in the form of a circular saw blade 57 as an alternative construction to the stump cutter D, illustrated in FIGURES 1, 2, 5 and 8, for sawing down or cutting up a tree. Any cutting element best suited to a particular job may be employed. The cutting elements D may be confined upon the shaft 33 by suitable means such as nuts 58. The shaft 33 is illustrated as being carried within the mandrel 34 by the sleeve 59.

Referring more particularly to FIGURES 3 and 4, the circumferentially spaced engaging means E are carried by a disc 60. The disc 60 is secured in fixed relation to the wheel A as by bolts 61. The disc has a hub 62 integral therewith, which extends over the shaft 14 of the wheel A. A sleeve 63 is secured to the shaft 14 by a setscrew 64 for confining the hub 62 for rotation upon the shaft 14.

A flat bar or link 65 has fixed connection with the sleeve 62 and extends upwardly in the area of the handle bars 66. The handle bars 66 have fixed connection with the chassis 10. A transverse support 67 is fixedly carried by the handle bars 66. A link 68 is pivotally carried by the support 67 as at 69, and a spring 70 normally causes the upper portion of the link 68 to pivot in a clockwise direction in FIGURE 3 so that a notch 68c engages the bar 65 to maintain same in contact with the support 67 in locked relation therewith. The locking element F includes an elongated sliding member 71, carried within spaced brackets 72 which have fixed connection on the bar 65. A stub shaft 73 is fixedly carried by the locking element slide 71 at the top thereof, and carries a handle 74 for rotation thereon. The handle 74 has an inwardly projecting arm 75 which may be lowered to be confined by the upper portion of the stop member 76 as best illustrated in solid line position in FIGURE 4. The stop member has fixed connection with the flat link 65. A spring 77 has fixed connection one one end with the flat link 65 as at 78, and on the other end as at 79 with the locking element slide 71 so as to normally move the slide 71 downwardly in FIGURE 3. When the slide 71 is moved downwardly, as illustrated in FIGURE 3, the lower portion thereof, engages one of the notches E carried within the disc 60, as illustrated at 79.

In order to release the locking element F from the engaging means E the handle 74 may be pulled upwardly, and the handle 80 may engaged by the thumb with the handle 74 being engaged by the fingers to facilitate this movement. A member 81 which is fixed to the sliding member 71 has a cam surface 81a which engages a surface 68a to cam the link 68 in the direction of the arrow in FIGURE 3 to move it out of the way for releasing the means G which includes the flat bar 65 and associated parts. The engaging means F, carried by the means G, are thus released from the fixed support 67 so as to advance the engaging member F, one notch to engage a succeeding engaging means E, as illustrated in solid line positions in FIGURE 4. The handles 74 and 80 may be depressed lowering the surface 81 against the inclined cam surface 68b to again move the link or latch 68 in the direction of the arrow, and to permit the flat link 65 to be returned to position for the locking surface 68c to move back into engagement therewith, as illustrated in broken lines in FIGURE 4. Thus, the entire device is moved or registered backwardly preparatory to cutting another swath with the cutting element D.

In operation the locking element F may be engaged with one of the engaging means E and the entire device is pivoted around the locked wheel A, the wheel B being in free-wheeling condition. The handle 30 may be moved rearwardly into dotted line position in FIGURE 1 so as to tighten the driving belts to permit the cutter D to be driven. The entire device is then pivoted about the wheel A to cut a swath about a stump on the back side thereof remote from the user. The cutting element preferably turns in the direction of the arrow in FIGURE 1 so as to throw the chips away from the operator. A shield 82 further prevents chips from being thrown upon the operator.

While a preferred embodiment of the invention has been described using specific terms, such description is for illustrative purposes only, and it is to be understood that changes and variations may be made without departing from the spirit or scope of the following claims:

What is claimed is:

1. A stump cutter having a chassis including, a pair of spaced wheels carried by said chassis capable of rotation independently of each other, a boom carried by said chassis, a driven cutter carried by aid boom, a plurality of circumferentially spaced engaging means carried in fixed relation to one of said wheels, a locking element carried by said chassis, movable into and out of locking position, said locking element being in fixed relation to said chassis when in locking position engaging said engaging means to fixed said one wheel with respect to the chassis leaving the other wheel free for rotation, and means for moving said locking element to engage a succeeding engaging means and for moving said locking element for moving the succeeding engaging means to locking position thus moving the chassis by a predetermined amount, whereby the cutter chassis may be pivoted about said one wheel during a stump cutting operation and said chassis moved preparatory to another cutting operation.

2. The structure set forth in claim 1, wherein the boom includes, a first tubular portion carried by the chassis at one end thereof, a second tubular portion carried by the first tubular portion at the other end thereof, a driven shaft carried adjacent the free end of said second tubular portion, said cutter being carried by said shaft, and a plurality of circumferentially spaced registering apertures carried by said first and second tubular portions, and an element passing through registering apertures fixing said tubular portions against rotation with respect to each other, whereby the second tubular portion may be turned with respect to said first tubular portion to bring desired apertures into registry to fix the cutter at a desired angular position.

3. The structure set forth in claim 1, wherein said means advancing said locking element includes a link pivotally carried by said one wheel carrying said locking element for sliding movement thereon between a position of engagement by said engaging means and a position of disengagement by said engaging means, and a support means fixed with respect to said chassis positioned rearwardly of said link for releasably fixing the means moving said locking element with respect to the chassis, whereby the locking element may be disengaged and the link pivoted forwardly and the locking element engaged preparatory to pivoting the link rearwardly for registering the chassis rearwardly and again fixing the means moving the locking element with respect to the support.

4. The structure set forth in claim 3, wherein said engaging means includes a disc fixed upon said one wheel, and wherein said support means includes a latch normally urged into engagement with said link and means camming said latch out of engagement with said link when said locking element is disengaged.

5. A stump cutter having a chassis including, a pair of spaced wheels carried by said chassis capable of rotation independently of each other, a forwardly projecting boom carried by said chassis, a driven cutter carried by said boom adjacent the free end thereof, a disc carried in fixed relation to one of said wheels, a plurality of circumferentially spaced notches in said disc, and a slidable locking element carried by said chassis, movable into and out of locking position, said locking element being in fixed relation to said chassis when in locking position for movement into a notch to fix said one wheel with respect to the chassis leaving the other wheel free for rotation.

6. A stump cutter having a chassis including, a pair of spaced wheels carried by said chassis capable of rotation independently of each other, a forwardly projecting boom carried by said chassis, a driven cutter carried by said boom adjacent the free end thereof, a disc carried in fixed relation to one of said wheels, a plurality of circumferentially spaced notches in said disc, a slidable locking element carried by said chassis, movable into and out of locking position, said locking element being in fixed relation to said chassis when in locking position for said engaging to fix said one wheel with respect to the chassis leaving the other wheel free for rotation, and means advancing said locking element to engage a succeeding notch and for moving said locking element for moving the disc rearwardly to locking position thus moving the chassis rearwardly by a predetermined amount, whereby the cutter chassis may be pivoted about said one wheel during a stump cutting operation and said chassis moved rearwardly preparatory to another cutting operation.

References Cited

UNITED STATES PATENTS 2,597,017   5/1952   McKinstry _____ 143—43 X

DONALD R. SCHRAN, *Primary Examiner.*